M. L. ANDREW.

Improvement in Shaft Couplings.

No. 122,426.   Patented Jan. 2, 1872.

Attest:
Wm. R. McComas.
Edwin Anderson.

Inventor:
Moses L. Andrew.
By F. Millward
Attorney

UNITED STATES PATENT OFFICE.

MOSES L. ANDREW, OF CINCINNATI, OHIO.

IMPROVEMENT IN SHAFT-COUPLINGS.

Specification forming part of Letters Patent No. 122,426, dated January 2, 1872.

I, MOSES L. ANDREW, of Cincinnati, Hamilton county, State of Ohio, have invented a certain new and useful Improvement in Shaft-Couplings, of which the following is a specification:

Nature and Object of Invention.

My invention relates to the class of "elastic bush-couplings;" and consists of a device by which a separate bush is provided for each end of the coupled shaft, both bushes fitting a single taper in an outer sleeve, and one being compressed by a drawing-nut while the other is compressed by a forcing-nut.

Description of the Accompanying Drawing.

Figure 1:
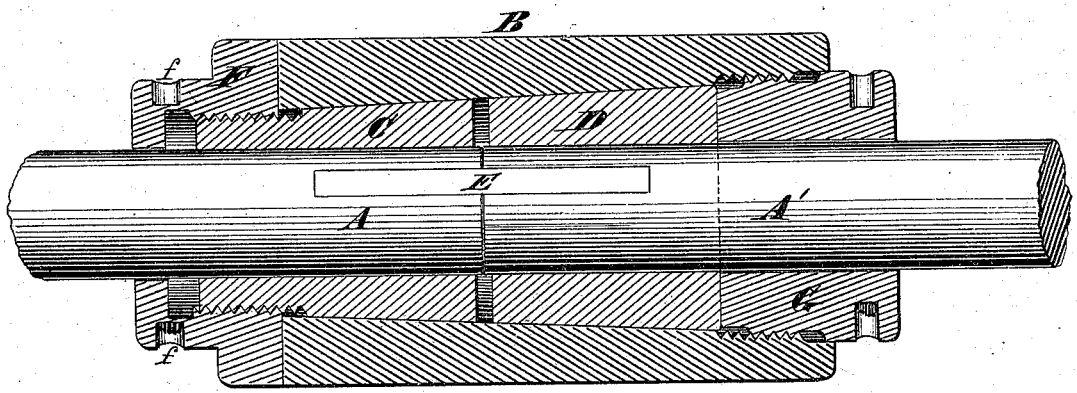
Figure 2:
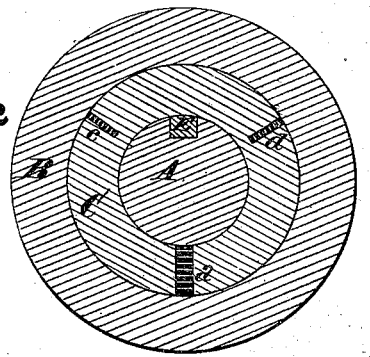
Figure 3:
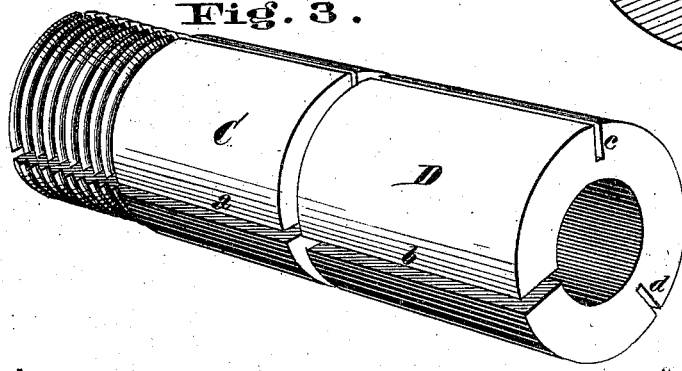

Figure 1 is an axial section of a coupling embodying my invention. Fig. 2 is a cross-section of the same. Fig. 3 is a perspective view of the elastic bushes.

General Description.

A A' are the ends of the two shafts to be coupled. B is an exterior sleeve, which is bored with a single taper, as shown, the taper extended the entire length except a short distance at one end, which is screw-threaded interiorly to receive a nut. The elastic bushes C D, which are bored to fit the shafts to be coupled, are turned tapering on the outside to so fit the sleeve B that the bushes shall be separated a short distance at the junction of the shafts. To effect this separation easily the bushes C D may be turned out of one piece of metal to fit the taper in the sleeve, and afterward cut in two by a tool wide enough to give the required amount of separation. A key, E, may be fitted to the shafts A A', simply to prevent one shaft turning without the other, under heavy strain, the key not being fitted into the coupling. The bushes C D are split entirely through the metal at $a\,b$, and may also be partially cut through at $c\,d$. The splits $a\,b$ permit of the contraction of the bushes to hug the shafts, and the partial splits $c\,d$ facilitate this contraction. The bush C is compressed upon the shaft A by being drawn through the sleeve B, the nut F being employed to accomplish it. This nut is fitted to a screw-thread on the exterior of the bush C, and is operated by a spanner fitted to the holes $f\,f$. The bush D is forced in by the nut G for the purpose of compressing it so as to hug the shaft, the nut G being fitted to the interior screw of the sleeve B and operated by a spanner.

It will be seen that the bushes C D being separate, and their operations being independent of each other, the shafts A A' may differ in size considerably and yet be securely held. In the manufacture of shafting it has been found almost impossible to turn the ends so nearly equal in size as to permit a single elastic bush to inclasp them both with the same degree of pressure.

The taper of sleeve B is specified as a single taper—that is, tapering from one direction only —in contradistinction to couplings having tapers in opposite directions. The bush C, however, may have a different degree of taper to bush D, if desirable.

A modification of my invention may consist in making the bush C the full length of the coupling, and thus dispensing with bush D and nut G; but this form is not calculated to fit uneven sizes of shafting.

Claim.

The combination of sleeve B, drawing-nut F, elastic bush C, nut G, and elastic bush D, the whole being connected and operating substantially in the manner and for the purpose set forth.

In testimony of which invention I hereunto set my hand.

MOSES L. ANDREW.

Witnesses:
FRANK MILLWARD,
WM. R. McCOMAS.